United States Patent [19]

Willard et al.

[11] 4,412,217
[45] Oct. 25, 1983

[54] PAGER WITH VISIBLE DISPLAY INDICATING STATUS OF MEMORY

[75] Inventors: David F. Willard, Plantation; Gerald W. Tidwell, Sunrise, both of Fla.

[73] Assignee: Motorola, Inc., Schaumburg, Ill.

[21] Appl. No.: 306,800

[22] Filed: Sep. 29, 1981

[51] Int. Cl.³ .................. H04B 5/04; H04M 11/00; H04Q 9/00
[52] U.S. Cl. ........................ 340/825.44; 179/2 EC
[58] Field of Search .......... 340/825.44, 311.1, 825.47; 179/2 EC

[56] References Cited

U.S. PATENT DOCUMENTS

| | | | |
|---|---|---|---|
| 3,976,995 | 8/1976 | Sebestyen. | |
| 4,181,893 | 1/1980 | Ehmke | 340/311.1 |
| 4,197,526 | 4/1980 | Levine, et al. | 179/2 EC |
| 4,249,165 | 2/1981 | Mori. | |
| 4,336,524 | 6/1982 | Levine | 340/825.44 |
| 4,356,519 | 10/1982 | Cogdell, Jr. | 340/311.1 |

OTHER PUBLICATIONS

*Ericsson Review*, vol. 56, No. 1, 1979, pp. 22–27, "Ericall Contactor—A Paging System with Message Transmission", Åkerberg.

Primary Examiner—Donald J. Yusko
Attorney, Agent, or Firm—Jerry A. Miller; Joseph T. Downey; Edward M. Roney

[57] ABSTRACT

A radio pager decoder including a register which is incremented when a page is received and a visual indicator which displays a count of the number of received pages. Pages may also be selectively retrieved from memory.

12 Claims, 7 Drawing Figures

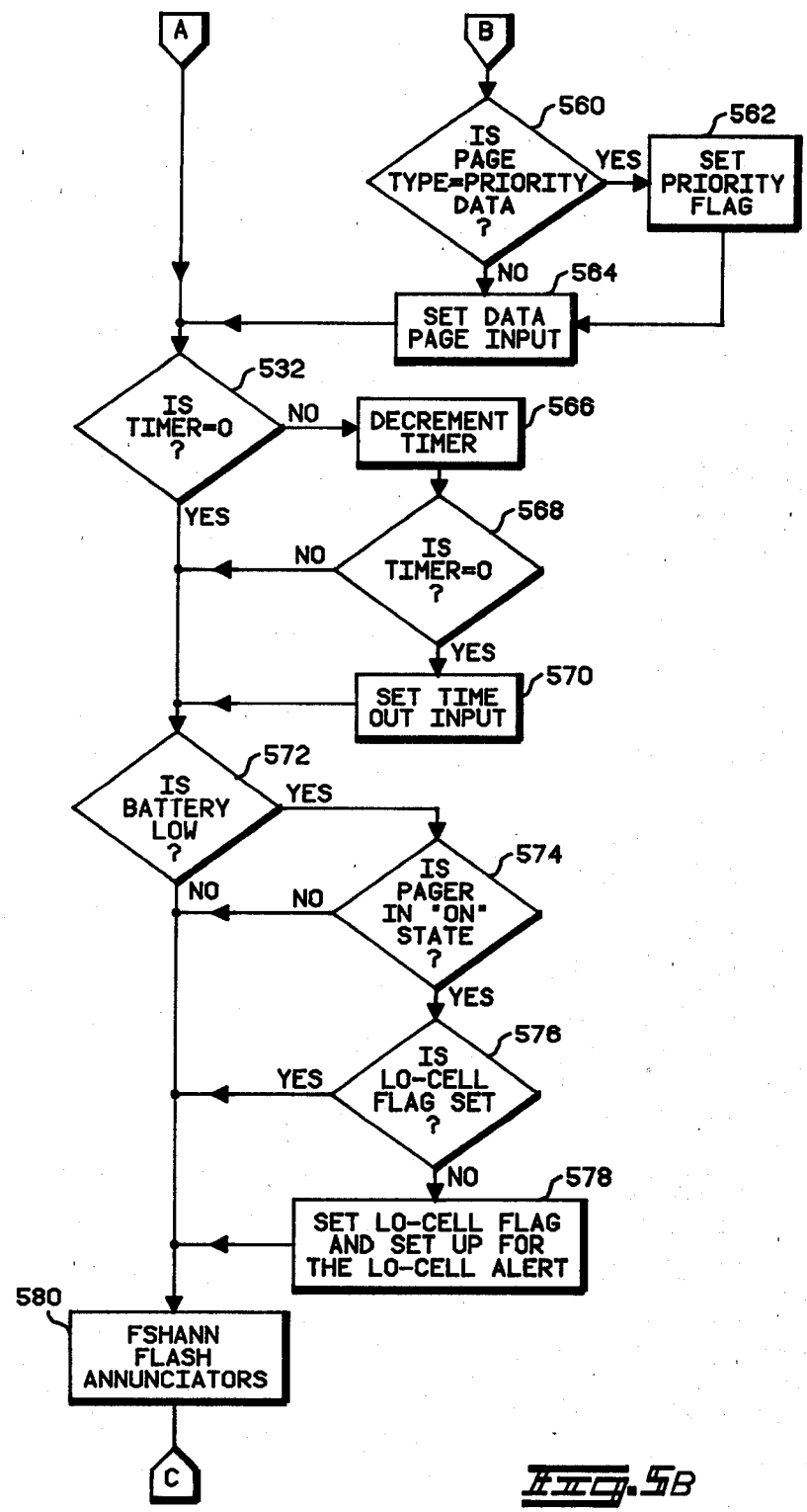

PAGER WITH VISIBLE DISPLAY INDICATING STATUS OF MEMORY

BACKGROUND OF THE INVENTION

This invention relates to pagers. In particular, it relates to pagers with visible displays of information that is sent.

A pager is a portable device for allowing a user at a remote location to receive information from a central location. In its simplest form, a pager may simply alert a number of users to the fact that their attention is required. They are then expected to call the central location to find who has called and what the message is. Some of the many refinements of this principle include selective calling which alerts only the user of a particular pager that he is being called. Another such feature is message paging which not only alerts the user with a signal of some sort but also delivers a message to the user. Other features are possible and have been used in some pagers. In increasing the number of available features, the designer of a pager normally maintains certain objectives, including some of the following. A user should be able to forget a paper until he is paged. This means that it is preferable that the pager be silent unless its user is called. It also means that the pager should be as light as possible since part of the weight of a pager is its batteries and one objective is to limit the needed electrical energy, and hence the size of the batteries required.

A conflict in the use of pagers arises when the user of a pager is in a group of people. On the one hand, it is desirable for a pager to make an unequivocal bid for the attention of its user. This has typically meant the use of a strident alert tone to minimize the possibility that the user might overlook a call. Such an alert tone can provide an unwelcome distraction when it interrupts the affairs of a group of people and may as a result become an embarrassment to the user of the pager. Often, the only remedy available to the user of the pager is to turn off the pager and thereby run the risk of missing a call. However, when he does this, he frustrates the principal purpose of a pager which is to make known to him, whatever his location, that someone has a message for him. From the point of view of the person who tries to reach the user of a pager, a switched-off pager means that the user of the pager has become unavailable.

It is evident that a desirable feature of a pager is an unobtrusive alert to its user. Such alerts have been achieved in the past with some form of indicator to the user that a call has been made while his volume has been turned down. However, such call indicators have been able to do no more than to alert the user of the need to call the communications center to find what message is there for him. If his pager is one that not only alerts him but also delivers a message, such as a numbered call, then that message is lost to him since it is not normally stored at the communications center.

The lack of utility of a pager that results when the user turns it off and receives a call is compounded further when the user receives a plurality of calls when he has turned off his sound. The user who hears a plurality of alert tones without receiving the associated messages has lost much of the utility of his pager. To make his pager the useful instrument that it should be while allowing him to continue to be an acceptable member of a social group, he needs some way to store messages that come to him while he is in a group and to recover those messages at a time when he can make use of the information.

If the user were at a fixed location, the solution would be simple. It is the conventional telephone answering service; record the message on a tape recorder for later playback. This is not a satisfactory solution, however, for the user of a pager because of the size and weight associated with a tape recorder and its associated playback equipment and the cost of such equipment. A pager that combined a tape recorder and means for playing back a recorded tape would cost too much and would be too big to be convenient for carrying as a pager.

There are several other features that are desirable to increase the utility of a pager. One of these is a priority system that allows certain callers to reach the user of the pager in spite of his attempts to turn off the volume. A priority feature could be combined with tone-only paging, with voice paging or with a data page. A tone-only, page in the absence of a display, merely alerts the user of a page to the fact that he has been paged without telling him of the source. It would be useful, in addition, to be able to inform him of the source of a tone-only page. Furthermore, if the user of a page has chosen to silence the alerts during a period of when he receives a non-priority voice page, it would be useful to him to know that he has received a voice page during the period of silence.

SUMMARY OF THE INVENTION

It is an object of the present invention to make a pager that can be silenced without losing pages.

It is a further object of the present invention to provide a pager that provides a visual indication to the user.

It is a further object of the present invention to provide a pager that displays to the user the fact of a call.

It is a further object of the present invention to display to the user the number of calls that have been received since he displayed the last such call.

It is a further object of the present invention to provide to the user a visual display of a number that he is asked to call.

Other object will become apparent in the course of a detailed description of the invention.

A pager with a visual display comprises a radio receiver, means for identifying a desired recipient of signals on the radio receiver, means for storing a signal received on the receiver, means for displaying the number of messages received during a given interval, and means for displaying a plurality of messages received.

BRIEF DESCRIPTION OF THE DRAWINGS

FIGS. 5A–5C are expanded flowcharts of the function generator of FIG. 4.

DETAILED DESCRIPTION OF THE INVENTION

Figure 1:
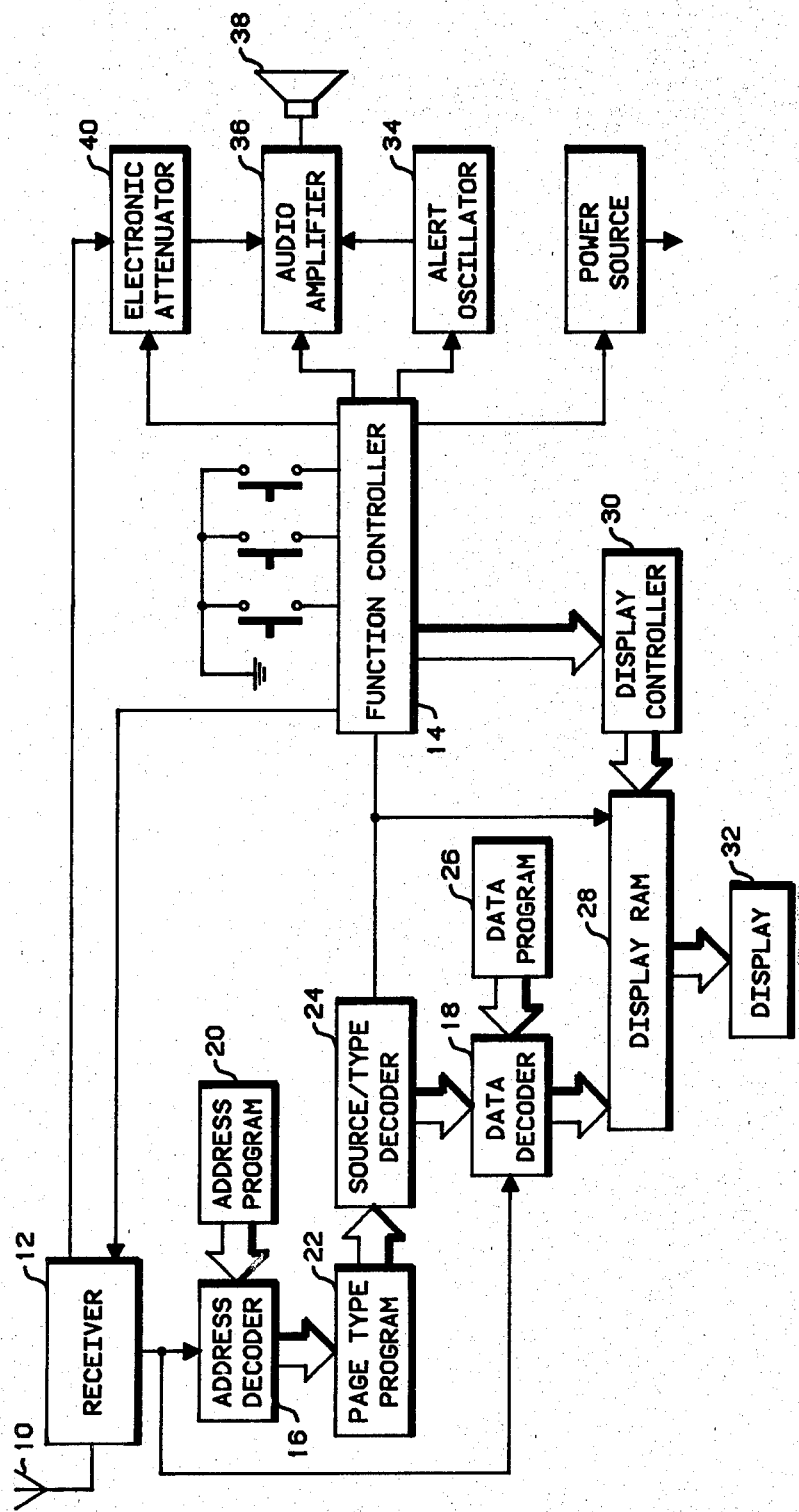
FIG. 1 is an overall block diagram of a pager embodying the present invention.

FIG. 1 is a block diagram of a pager embodying the present invention. In FIG. 1 an antenna 10 receives a signal that is coupled to a receiver 12 that is subject to the control of function controller 14. The function controller not only controls switching on and off of receiver 12, it may also operate receiver 12 on an intermittent basis to extend the life of batteries in a pager. Receiver 12 has outputs to address decoder 16 and data decoder 18. Address decoder 16 compares received address words with an address program 20 to see if the particular pager has been called and keeps the pager from functioning if it is not called. If address decoder 16 and address program 20 detect a call to this pager, page type program 22 next determines the type of page that is being made by applying a signal to source-type decoder 24. If the page is a data page, then source-type decoder enables data decoder 18 which is controlled by data program 26 to supply data to display RAM 28. Display RAM 28 is controlled by display controller 30 under the control of function controller 14 to display data on display 32.

The user of the pager of FIG. 1 will normally first become aware of a page when he hears an alert. This will be generated in alert oscillator 34 under the control of function controller 14. Alert oscillator 34 feeds audio amplifier 36, which is also controlled by function controller 14, and delivers the alert to speaker 38. If the alert is followed by a voice page, the audio signal proceeds from receiver 12 to electronic attenuator 40 which sets an audio level subject to function controller 14. If the page is tone-only or data, then the alert signal is the only audible signal, and other information is made available to the user on display 32. If the page is a data page, then display 32 displays decoded data from data decoder 18 and display RAM 28, and it also displays the source under the control of function controller 14. If the page is voice, then the user hears the sound from receiver 12 through electronic attenuator 40, audio amplifier 36 and speaker 38. If the page is tone-only, the user hears an alert tone that is generated internally by alert oscillator 34 and connected to audio amplifier 36 and speaker 38. He also sees on display 32 the word "Call" and an indication of the source of the call.

Figure 2:
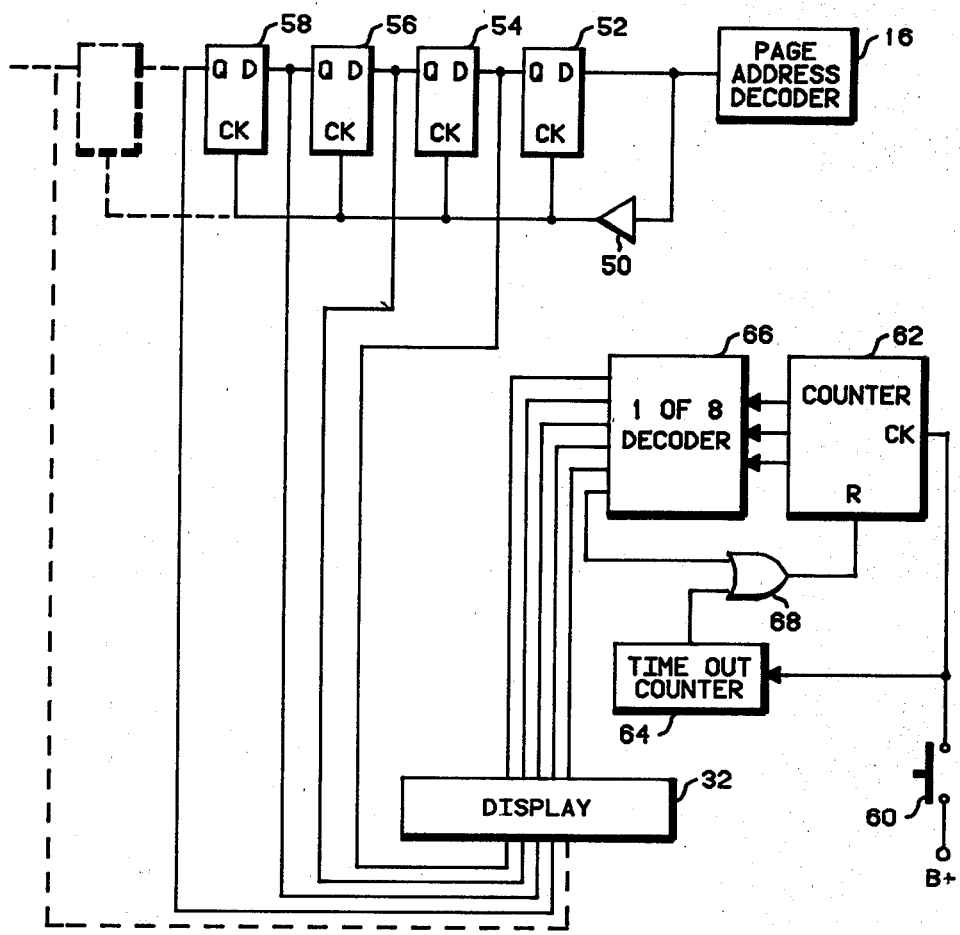
FIG. 2 is a circuit diagram of a circuit for indicating the status of memory in the display pager of the present invention.

The particular advantage of a display pager is the ability to store messages that arrive at a time that is inconvenient for action and to make those messages available later to the user of the pager. To make this feature useful, the user of the pager must be able to check his pager to see if it contains any messages that he has not yet read. The circuit of FIG. 2 is a display controller to indicate the presence in memory of messages that have not yet been read. In FIG. 2, page address decoder 16 supplies an output when a tone-only or data page is received. This output is delayed in delay element 50 and is applied to clock flip-flops 52, 54, 56 and 58 which are connected in cascade to form a register. The outputs of each of the flip-flops 52, 54, 56 and 58 are connected to a separate message indicator in display 32. Thus, a single output from address decoder 16 will set flip-flop 52 and provide an indication of a single message on display 32. Receipt of another message will set flip-flop 54, indicating the presence of a second message that is in memory and is subject to recall. Messages are recalled from memory by a read button 60 which clocks counter 62 and resets time-out counter 64. The output of counter 62 is applied to one of eight decoder 66 which produces a zero output under normal conditions. This sets a visual indicator in a standby position on the display, indicating that no messages are being recalled. When read button 60 is pressed once, counter 62 provides a pulse to decoder 66 that causes it to count to one, calling the first message to the display. Repeated operation of read button 60 causes decoder 66 to count in sequence through four messages that may be stored in memory. When decoder 66 counts to five, this triggers OR gate 68 to reset counter 62. In the alternative, time-out counter 64 will provide an impulse to OR gate 68 that will reset counter 62 if the user has not attempted to read five messages.

Figure 3:
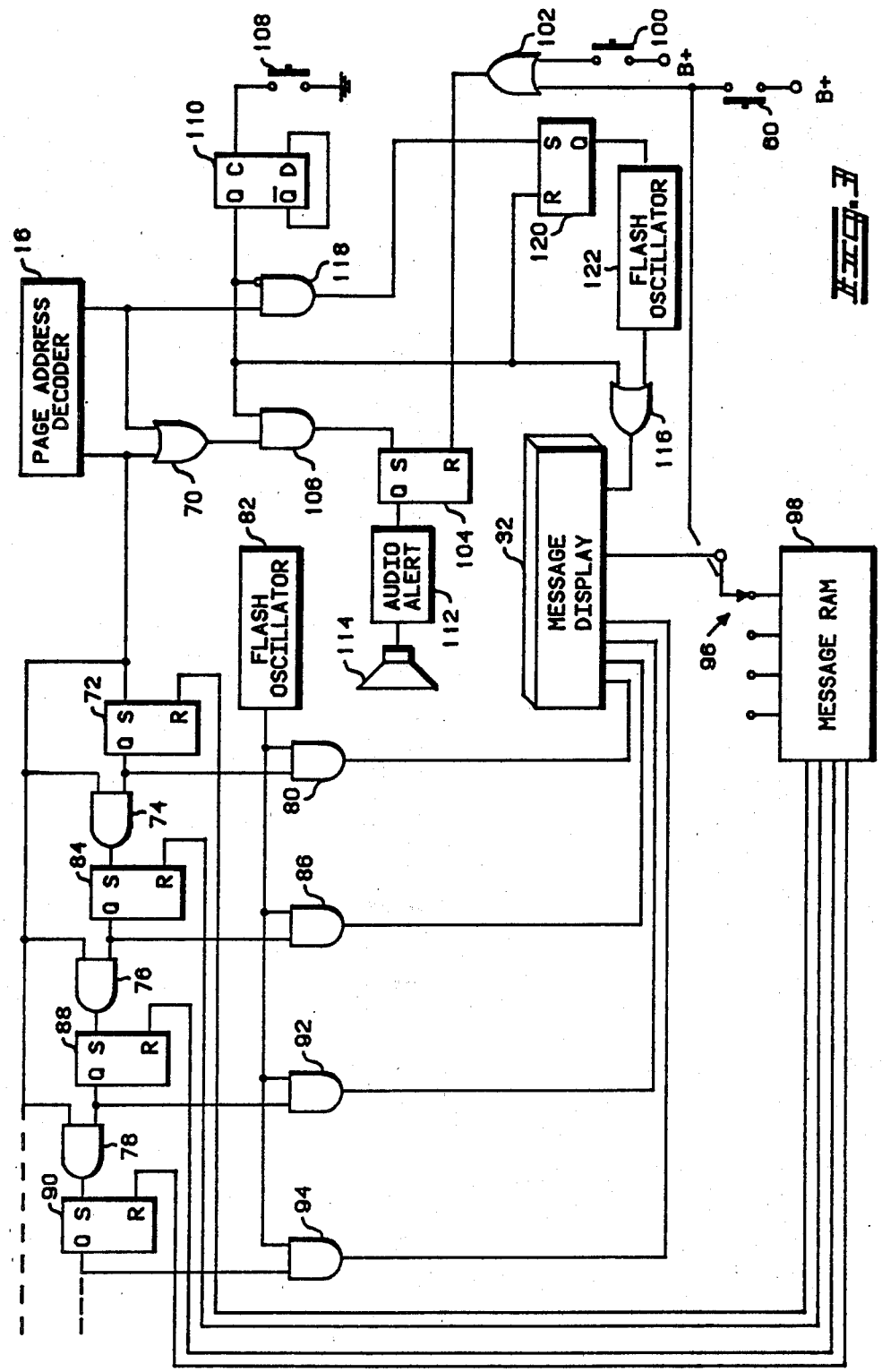
FIG. 3 is a circuit diagram of a circuit for storing and display the presence of unread messages in the pager of the present invention.

The user of the pager thus has a display that indicates to him that there are no messages or one, two, three or four messages in memory in his pager. As new messages are received, they are placed first into memory and are read back first so that earlier messages, whether read or unread, are lost from memory. It would be useful to the user to know not only the number of messages in his memory but also to know whether he has read these messages. The circuit of FIG. 3 provides an indication to the user of the presence in memory of messages that have not been read. In FIG. 3, page address decoder 16 provides an indication of the receipt of a page. If that page is a data page or a tone-only page, a signal is provided to OR gate 70 and to flip-flop 72, as well as to AND gates 74, 76 and 78. Flip-flop 72 generates an output in response to the signal indicating a data page or a tone-only page. That response is taken as an input to AND gate 74 and as an input to AND gate 80. A second input to AND gate 80 is supplied by flash oscillator 82. The output of AND gate 80 is a flashing indication that is taken to display 32 to provide a flashing display indicating the receipt of a page. If a second page is received, AND gate 74 triggers flip-flop 84 which produces an output that is taken to AND gates 76 and 86. The output of AND gate 86 supplies a flashing indication of the receipt of a second page. Similarly, flip-flops 88 and 90 supply indications of receipt of a third and fourth page, respectively. These indications are taken respectively to AND gates 92 and 94 to provide displays of receipt of a third and a fourth page.

When the user has read his pager, it is desirable to have the flashing cease. This is accomplished by pressing read switch 60 which both increments display-increment switch 96 and also generates an output from message flip-flops 98 when a complete message has been displayed for reading. If the page was tone-only, a complete message is one display indicating the source of the message. A data page may require recall either manually or automatically of up to four separate lines of display for displayed numbers and their source. A message is considered to be read if each line of the message has been displayed at least once. When this happens, flip-flops 98 provide signals that reset the appropriate one or ones of flip-flops 72, 84, 88 and 90.

The circuit of FIG. 3 also includes means for controlling an audible alert. The alert is reset either by read button 60 or reset button 100. Each supplies an impulse to OR gate 102 that resets flip-flop 104. The receipt of a page of any kind produces an output from OR gate 70 that is taken to AND gate 106. If silent button 108 is depressed, flip-flop 110 generates a low input that inhibits AND gate 106. In the absence of such a signal, AND gate 106 triggers flip-flop 104 to enable audio alert 112, driving speaker 114 with an alert signal. If silent button 108 is depressed, resetting flip-flop 110, there will be no signal from speaker 114. There will also be an absence of signal delivered to OR gate 116 which enables a visual display of a symbol of a speaker. This provides a visual indication to the user that his pager is in the silent mode. If he receives a voice page in the silent mode, this enables AND gate 118 which sets flip-flop 120, producing an output to enable flash oscillator 122. The output of flash oscillator 122 is taken to OR gate 116 to provide a flashing indication of a speaker on the display indicating to the user that he has received a voice page while in the silent mode.

Figure 4:
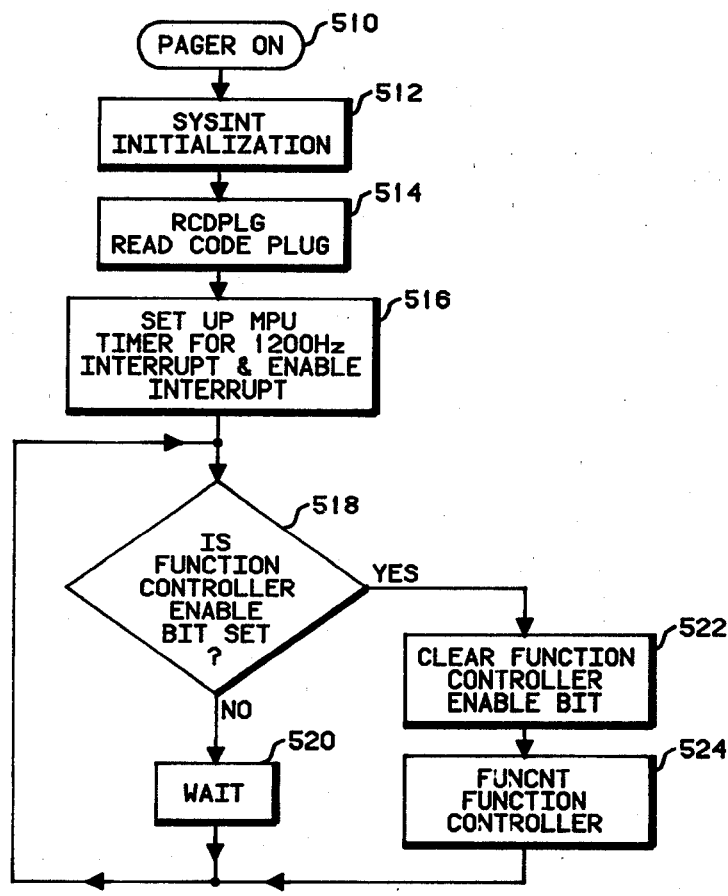
FIG. 4 is a flowchart describing the method of operation of the pager of the present invention.

FIG. 4 is a block diagram of the method of operation of the display pager of the present invention. In FIG. 4, block 510 turns on the pager in response to the pressing of an "ON" button. This calls for the steps of initialization block 512, which sets the volume of the audio at a maximum level, opens a receiver channel, sounds an alert, and turns on a display for a user to check. After a timed interval, the audio signal is turned off, and the display is caused to show the word "ON". The next step in the method is indicated by block 514 which directs the reading of a code plug. The code plug contains information identifying one or a plurality of numbers assigned to a particular pager, together with information identifying the function associated with that number. The possible functions that may be encoded in the code plug are tone only, voice page and data page. Any of these may be subjected to a priority call, which overrides the selection of a silent mode. The particular functions chosen by the user and the calling identification numbers associated with each are stored in the code plug. The step of reading the code plug that is directed by block 514 reads that information from its place of permanent storage in the code plug into a buffer memory for quick access. With these functions complete, the pager is on and ready.

The process of detecting page and establishing synchronism between a received signal and the direction process of the pager has been dealt with extensively in U.S. Pat. Nos. 3,801,956 and 3,855,576 which are assigned to the assignee of the present invention. These patents are incorporated here by reference as if set forth fully herein. In these patents and in the present invention, a received signal is sampled repeatedly, and the sampled bits that are detected are subjected to correlations to detect the presence of a preamble word, and, if the preamble words is detected, a sync word and page address. In the pager of the present invention, the received signal is sampled at a rate of 1200 Hz. This operation is controlled by operations box 516 which sets and starts a timer to develop interupts at a rate of 1200 Hz. Operations box 516 also directs the setting of a counter that produces an enable signal for a function controller. Decision block 518 next tests for the presence of an enable bit for the function controller. If there is no bit, control proceeds to operations box 520 which detects a wait. Exit from operations box 520 is to decision block 518, maintaining control in a waiting mode in the absence of an enable bit for the function controller. If the function controller bit is set, exit from decision block 518 is to operations block 522 which clears the controller enable bit until its next setting, and directs entry into function controller box 524.

Figure 5A:
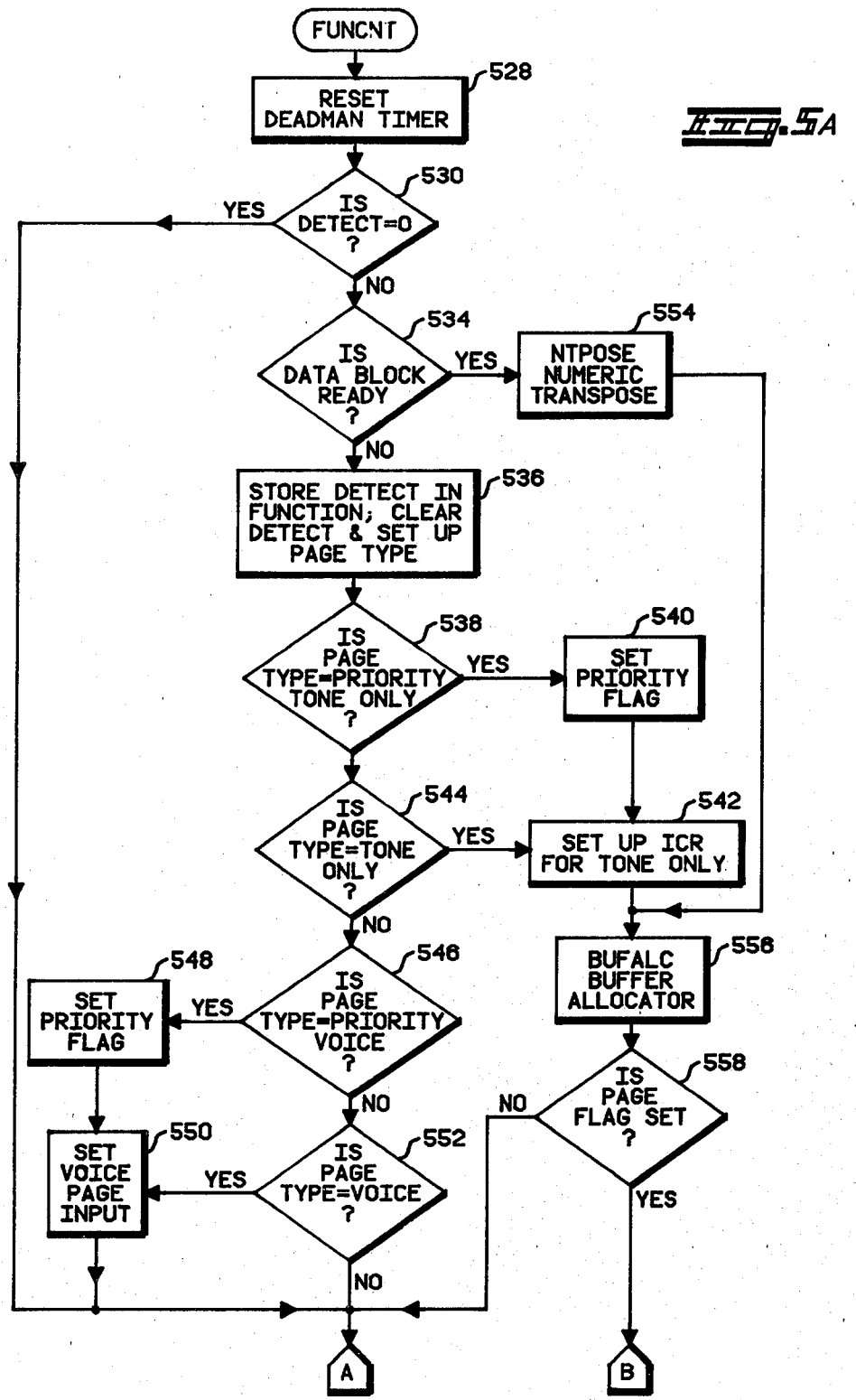
Figure 5C:
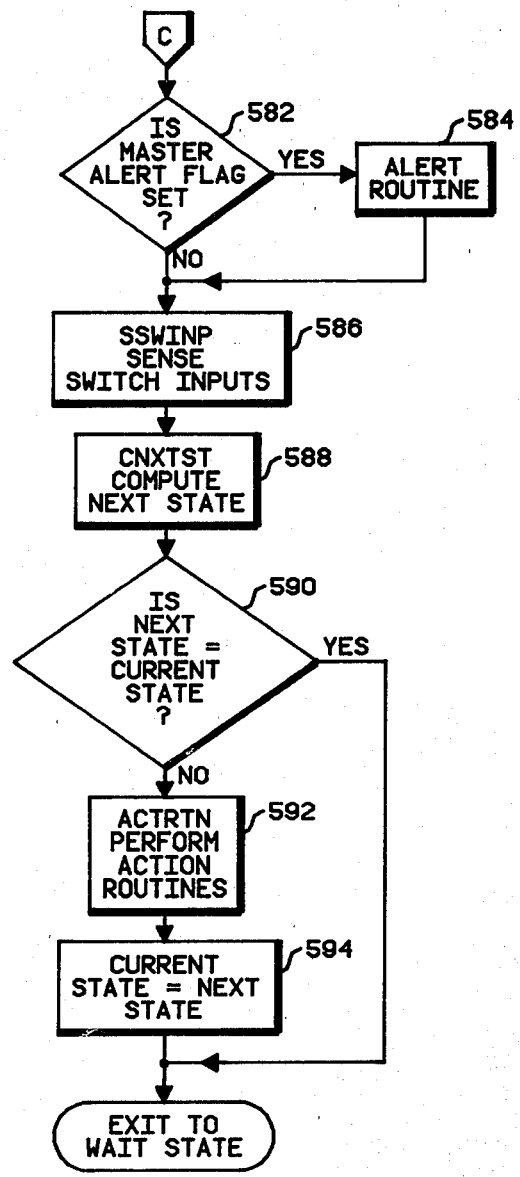

FIG. 5 is an expanded flowchart of function controller block 524 of FIG. 4. In FIG. 5, after operations box 528 resets a deadman timer, decision block 530 tests for the presence of a detect signal. The detect signal is zero if a page has not been received, and it is a number 1 through 9 if a page is received. If a zero detect signal is received, indicating the absence of a page, exit from decision block 530 is to decision block 532. If the detect signal is a number 1 through 9, exit from decision block 530 is to decision block 534 which tests for the presence of a data page. This represents a test for the presence of a detect number 9 which indicates that data will follow. Assume first that the page is not a data page. Exit from decision block 534 in this case is to operations box 536 which directs the storing of the detected number and clearing of the detect number to reset for a future page. Exit is then to decision block 538 which tests to see if the received page is tone only and also priority. A priority page of whatever type is one that allows the caller to override selection by the user of a silent mode. If the page that has been received is both tone only and priority, exit from decision box 538 is to operations box 540 to set a priority flag, then to operations box 542 to set an input code register for tone only. If the received page is not tone only and priority, exit from decision block 538 is to decision block 544 which tests to see if the page is tone only. If it is, exit is again to operations box 542. Suppose now that the detected page is not tone only. Exit from decision block 544 is then to decision block 546 which tests for the presence of a priority voice page. If there is one, exit is to decision box 548 to set a priority flag, then to operations box 550 to set the pager for a voice page input. If the page is not a priority voice page, exit from decision box 546 is to decision box 552 which tests for the presence of a voice page. If there is one, exit is also to operations box 550.

Consider now a comparison of the operation of the pager on tone only and on data. In either case, the user is alerted to the arrival of a page and he hears no more than the alert signal. If he is in a silent mode and receives a non-priority page, he will receive a tactile alert. He then looks to his pager for a displayed message. If the page is tone only, then the only message will be the word "Call" and the source of the page. If the message is a data message, then the data must be received and decoded before display. Consider now the exit from decision block 534 of FIG. 5. When a data page has been received, the data will be a Golay sequential code which is selected to minimize the loss of data in the presence of noise and fading. If the presence of such data causes an exit from decision box 534 to operations box 554 which directs the transposition of the numerical data, one of two types of information is then directed to operations box 556. If the page was tone only, this will be treated like a decoded data page in which the message is the word "Call" and the source information. Thus, either the combination of the word "Call" and the source information as directed from operations box 542, or the data as directed by operations box 554, will be allocated to storage under the control of buffer allocator 556 which also sets a page flag after the last data block. Decision block 558 next tests for the presence of a page flag indicating the presence in memory of a completed data page. If there was none, exit is to decision block 532. If there is a page flag indicating the presence of a data page, exit is to decision block 560 which tests whether the page is a priority data page. If it is, operations block 562 sets a priority flag and exits to decision block 564. If the page is not a priority data page and is therefore a data page only, exit from decision block 560 is to operations block 564 which sets a data page input.

All exits from preceding sections of the flowchart of FIG. 5 have now led to decision block 532 which tests to see if the timer that was set in the action routine that corresponds to the state now in operation has counted to zero. If it has not, operations block 566 decreases the count in the timer by one, and decision block 568 checks to see if the timer is now at zero. If it is, exit is to operations block 570 to set the time-out input. If the indication from decision block 532 was that the timer equaled zero, exit is to decision block 572. If the timer was not at zero and did not reach zero after being once decreased, then exit from decision block 568 is also to decision block 572. Finally, if the timer was not zero but reached zero upon being reduced once, then the exit from operations block 570 was also to decision block 572 which tests to see if the battery is low. If it is, exit is to decision block 574 to test whether the pager is on. If so, exit is to decision block 576 which tests to see if the low-cell flag is set. If it has not, operations block 578 sets a low-cell flag and sets up to alert the user of a low cell. Alternate responses from decision blocks 572, 574 and 576 exit along with the exit from decision block 578 to operations block 580 which controls the flashing of annunciators in the pager display and the speaker. The pager has alerts for a low battery, a full memory, the detection of bad data, the receipt of a data page and the receipt of a voice page. It is evident that only the low-battery alert need be operated in the absence of a page since all of the other alerts are triggered by the receipt of a page. Thus, the pager will have received information that control alerts relating to paging from an earlier portion of the flowchart of the FIG. 5 and will have received information as to a low battery from the sequence starting with decision block 572. These are tested by decision block 582 which tests to see if an alert flag is set. If an alert flag is set indicating the presence of one of the alert conditions described above, then operations block 584 generates the appropriate alert. Exit from decision block 582 and operations block 584 is to operations block 586 which directs the sensing of switch inputs. Operations block 588 next directs the determination of the next state. This will be discussed further in connection with an examination of a state table. Decision block 590 next asks whether the next state is equal to the current state. If it is, then exit is to the wait loop of FIG. 4, into the input of decision block 518. If the next state in the state table is not the same as the current state, then exit from decision block 590 is to operations block 592 which calls for the performance of the action of the next state. Operations block 594 next updates the current state and returns control to the wait loop of FIG. 4.

Certain features of the operation of the pager of the present invention are summarized in the State Table. Reference has already been made to the State Table in describing the effects of decision block 590 in FIG. 5. This operation will be made clearer from a consideration of the states of the State Table which lists inputs in priority order and the states of operation of the pager.

STATE TABLE

| INPUTS<br>STATES | ON/OFF | READ | HOLD | DATA PAGE | VOICE PAGE | TIME OUT | ACTION ROUTINE |
|---|---|---|---|---|---|---|---|
| OFST | PUPT | — | — | — | — | — | Off State |
| PUPT | — | — | — | — | — | PUPA | Power-up Tone State |
| PUPA | — | — | — | — | — | ONST | Power-up Audio State |
| ONST | OFST | INTS | — | DPST | VPST | ONST | On State |
| INTS | OFST | INTS | FDSP | DPST | VPST | ADVS | Interrogate State |
| ADVS | OFST | INTS | FDSP | DPST | VPST | ADVS | Advance State |
| FDSP | OFST | INTS | FDSP | DPST | VPST | ONST | Freeze Display State |
| DPST | OFST | INTS | — | DPST | VPST | ONST | Data Page State |
| VPST | OFST | — | — | DPST | VPST | MONS | Voice Page State |
| MONS | OFST | INTS | — | DPST | VPST | ONST | Monitor Audio Channel State |

In the State Table the vertical column on the left lists all the possible state of operation of the pager. The headings listed horizontally across the top of the State Table are inputs that call various states. Three inputs are by manual controls. They are the on-off button, the read button, and the hold button. Two inputs are initiated by external action. They are the data page and the voice page. The last input is time out, which is generated internally to advance to another state if no other input causes an advance. Dashes in the State Table indicate inputs that are ignored when the pager is in a particular state.

Consider now a pager that is off. It is in the off state of the top entry of the left column. Looking along the top row, it is evident that no input will affect that state except for the on-off button. Pushing the on-off button will cause a state change to power-up tone state which is in the first column, second row. Nothing will happen until time out, which will then advance to power-up the third row. This will time out and will then advance to the on state. If the on/off button is actuated again, the pager will be turned off. If it is not, then other states may be called by the arrival of a page, by a time-out, or by the use of the read or hold button as indicated in the state table. Of the states in the state table, the interrogate state is called by a read button. The read button is used to interrogate memory and call something from memory to be placed on a display. The hold button calls a state marked "freeze display." This interrupts the normal cycling of the display to provide time for such activities as writing down a displayed number.

We claim:

1. In a pager, a method of indicating a number of received pages comprising the steps of:
   incrementing a register when a page is received; and
   displaying a count from the register, which count is a measure of the number of received pages.

2. A pager including a receiver, means for decoding an address in a received page, and means for controlling functions, the pager comprising:
   means for detecting a received page;
   means for counting a number of detected received pages; and
   means for displaying a measure of the count.

3. The apparatus of claim 2 wherein the means for counting comprises a plurality of flip-flops connected in cascade with a delayed trigger.

4. The apparatus of claim 3 comprising in addition means for selecting a desired one of the received pages.

5. In a pager including a page address decoder that produces a pulse in response to a received page, a circuit for indicating a number of received pages comprising:
- a plurality of cascaded flip-flops connected to the page address decoder, receiving as an input the pulse from the page address decoder, and receiving as a clock input a delayed pulse from the page address decoder; and
- a plurality of message indicators equal in number to the number of cascaded flip-flops, each one of the message indicators connected to a different one of the flip-flops of the cascaded flip-flops to indicate a number of flip-flops that have been triggered, which number is a measure of the number of received pages.

6. The circuit of claim 5 comprising in addition
- a voltage source;
- a read button connected to the voltage source;
- a counter connected to the read button to count in response to an actuation of the read button;
- a decoder connected to the counter to produce a signal on one of a plurality of lines according to the count in the counter; and
- a plurality of indications, one connected to each of the lines to indicate the count in the counter; which count is a measure of a number of actuations of the read button.

7. A paging receiver including a memory, comprising:
- means for detecting a plurality of types of received pages;
- means for determining which of said types of received pages has been received; and
- means for counting a number of received pages of a particular type.

8. The paging receiver of claim 7, further including means for displaying a measure of the number of received pages of a particular type counted by said counting means.

9. The paging receiver of claim 8, wherein:
- said detecting means includes means for detecting voice type received pages and means for detecting tone type received pages; and
- said counting means includes means for counting the number of tone type received pages.

10. The paging receiver of claim 8, wherein:
- said detecting means further includes means for detecting voice type received pages and means for detecting data type received pages; and
- said counting means includes means for counting the number of data type pages.

11. The paging receiver of claim 7, further including:
- a visual indicator, operatively coupled to said determining means, for indicating that a certain one of said types of pages has been received.

12. The paging receiver of claim 7, wherein said counting means includes means for assigning message numbers to received pages of said particular type so that said message number is indicative of the order of receipt of said particular type of received pages.

* * * * *